US012241002B2

(12) United States Patent
Fearon et al.

(10) Patent No.: US 12,241,002 B2
(45) Date of Patent: Mar. 4, 2025

(54) ANAEROBICALLY CURABLE COMPOSITIONS

(71) Applicant: Henkel AG & Co. KGaA, Duesseldorf (DE)

(72) Inventors: Stephen Fearon, Dublin (IE); Gavin Haberlin, Dublin (IE); David Condron, Dublin (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 360 days.

(21) Appl. No.: 17/450,549

(22) Filed: Oct. 11, 2021

(65) Prior Publication Data

US 2022/0025234 A1  Jan. 27, 2022

Related U.S. Application Data

(63) Continuation of application No. PCT/EP2020/060272, filed on Apr. 9, 2020.

(30) Foreign Application Priority Data

Apr. 11, 2019  (GB) ..................... 1905119

(51) Int. Cl.
C09J 175/14 (2006.01)
C09J 5/00 (2006.01)
C09J 11/04 (2006.01)
C09J 11/08 (2006.01)

(52) U.S. Cl.
CPC ............. C09J 175/14 (2013.01); C09J 5/00 (2013.01); C09J 11/04 (2013.01); C09J 11/08 (2013.01); C09J 2423/04 (2013.01); C09J 2475/00 (2013.01)

(58) Field of Classification Search
CPC .................................... C09J 175/14
See application file for complete search history.

(56) References Cited

U.S. PATENT DOCUMENTS

| 3,218,305 | A |  | 11/1965 | Krieble |  |
|---|---|---|---|---|---|
| 3,425,988 | A |  | 2/1969 | Gorman et al. |  |
| 4,180,640 | A |  | 12/1979 | Doherty et al. |  |
| 4,287,330 | A |  | 9/1981 | Rich |  |
| 4,321,349 | A |  | 3/1982 | Rich |  |
| 4,447,563 | A | * | 5/1984 | Kanaoka | C08F 299/065 524/718 |
| 4,574,138 | A |  | 3/1986 | Moran et al. |  |
| 5,700,891 | A |  | 12/1997 | Huver et al. |  |
| 6,013,750 | A | * | 1/2000 | Friese | C08L 55/005 526/218.1 |
| 7,173,072 | B2 | * | 2/2007 | Itai | C08G 18/8175 522/182 |
| 10,407,596 | B2 |  | 9/2019 | Morgeneyer et al. |  |
| 2008/0102262 | A1 | * | 5/2008 | Esaki | G11B 7/24056 428/220 |
| 2015/0044490 | A1 | * | 2/2015 | Kurimura | C09J 5/00 428/522 |
| 2019/0002617 | A1 | * | 1/2019 | Kotani | C09J 7/385 |
| 2019/0031921 | A1 |  | 1/2019 | Mullen et al. |  |
| 2020/0317973 | A1 | * | 10/2020 | O'Dwyer | C09K 3/1021 |

FOREIGN PATENT DOCUMENTS

| CN | 1324389 A |  | 11/2001 |
| CN | 101338173 |  | 1/2009 |
| CN | 103509509 |  | 1/2014 |
| CN | 104356997 |  | 2/2015 |
| CN | 106103524 A |  | 11/2016 |
| CN | 107841279 | * | 3/2018 |
| EP | 0640672 A1 |  | 3/1995 |
| EP | 3395922 |  | 10/2018 |
| KR | 101311333 |  | 10/2013 |
| WO | 0011097 A1 |  | 3/2000 |
| WO | 2017068196 |  | 4/2017 |

OTHER PUBLICATIONS

PCT International Search Report—WO PCT/EP2020/060272—Mailing date: May 15, 2020.
R.D. Rich, "Anaerobic Adhesives" in Handbook of Adhesive Technology, 29, 467-79, A. Pizzi and K.L. Mittal, eds., Marcel Dekker, Inc., New York (1994).
Fine Organic Chemistry, Peng Anshun et al., University of Petroleum Press, Aug. 1996, 1st Edition, 1st printing, pp. 187-189 (English language and Chinese language excerpts of the relevant portions cited in a counterpart Chinese patent application).
Polymer Physics, Xie Wenxin et al., National Defense Industry Press, Nov. 1989, 1st Edition, 1st printing. p. 269 (English language and Chinese language excerpts of the relevant portions cited in a counterpart Chinese patent application).

* cited by examiner

Primary Examiner — Margaret G Moore
(74) Attorney, Agent, or Firm — Steven C. Bauman

(57) ABSTRACT

An anaerobically curable composition comprising a hydroxy-functionalized mono(meth)acrylate compound, an aromatic mono(meth)acrylate compound which is not the same as the hydroxy-functionalized mono(meth)acrylate compound, a (meth)acrylate functionalised polyurethane resin, and an anaerobic cure inducing component.

17 Claims, No Drawings

US 12,241,002 B2

ANAEROBICALLY CURABLE COMPOSITIONS

FIELD

The present invention relates to anaerobically curable compositions, methods of bonding and/or sealing using anaerobically curable compositions, assemblies bonded or sealed using anaerobically curable compositions and cure products of anaerobically curable compositions.

BRIEF DESCRIPTION OF RELATED ART

Anaerobically curable compositions generally are well known. See e.g. R. D. Rich, "Anaerobic Adhesives" in Handbook of Adhesive Technology, 29, 467-79, A. Pizzi and K. L. Mittal, eds., Marcel Dekker, Inc., New York (1994), and references cited therein. Their uses are legion and new applications continue to be developed.

Anaerobic adhesive systems are those which are stable in the presence of oxygen, but which polymerize in the absence of oxygen. Polymerization is initiated by the presence of free radicals, often generated from peroxy compounds. Anaerobic adhesive compositions are well known for their ability to remain in a liquid, unpolymerized state in the presence of oxygen and to cure to a solid state upon the exclusion of oxygen. As a result of their ability to cure in a substantially oxygen-free environment, anaerobically curable compositions are widely used as adhesives, sealants, and for bonding materials with closely mated surfaces.

Oftentimes anaerobic adhesive systems comprise resin monomers terminated with polymerizable acrylate ester such as methacrylate, ethylacrylate and chloroacrylate esters [e.g., polyethylene glycol dimethacrylate and urethane-acrylates (e.g., U.S. Pat. No. 3,425,988 (Gorman)] derived according to known urethane chemistry. Other ingredients typically present in anaerobically curable adhesive compositions include initiators, such as an organic hydroperoxide for example cumene hydroperoxide, tertiary butyl hydroperoxide and the like, accelerators to increase the rate at which the composition cures, and stabilizers such as quinone or hydroquinone, which are included to help prevent premature polymerization of the adhesive due to decomposition of peroxy compounds.

Desirable cure-inducing compositions to induce and accelerate anaerobic cure may include one or more of saccharin, toluidines, such as N,N-diethyl-p-toluidine ("DE-p-T") and N,N-dimethyl-o-toluidine ("DM-o-T"), and acetyl phenyl hydrazine ("APH") with maleic acid. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Saccharin and APH are used as standard cure accelerator components in anaerobic adhesive cure systems. Indeed, many of the LOCTITE®-brand anaerobic adhesive products currently available from Henkel Corporation use either saccharin alone or both saccharin and APH.

For some applications, bonding using an anaerobic composition is troublesome. For example, conventional anaerobically curable compositions are ineffective for bonding some substrates, such as passive ones like plastics and some alloys. For such applications two-part compositions may be formulated. Formulating the compositions as two-part compositions allows a greater degree of freedom in selection of components. For example, it may be possible to place a cure initiator in one part of a two-part composition. When the two parts of the composition are brought together under suitable anaerobic conditions the composition cures.

It is also possible to use an activator for substrates that are difficult to bond utilising anaerobically curable compositions. Where two substrates are to be bonded together, an activator may be applied to at least one of the substrates. So for example, when bonding two substrates together, where at least one of those substrates is a difficult to bond substrate, an activator may be applied to either substrate, though desirably it is applied to the difficult to bond substrate. Where there is more than one substrate, and for example where there is more than one difficult to bond substrate, it is desirable that the activator is applied to each substrate.

It is desirable to provide alternative systems for bonding and methods of bonding utilising anaerobically curable compositions.

SUMMARY

In one aspect, the present invention provides an anaerobically curable composition comprising:
(i) a hydroxy-functionalized mono(meth)acrylate compound,
(ii) an aromatic mono(meth)acrylate compound which is not the same compound as the hydroxyl-functionalized mono(meth)acrylate compound,
(iii) a (meth)acrylate functionalised polyurethane resin, and
(iv) an anaerobic cure inducing component.

As used herein, the term "(meth)acrylate" or "(meth) acrylic" refers to acrylate and/or methacrylate species. The term "mono(meth)acrylate" refers to the presence of a single (meth)acrylate group, while the term "multi(meth)acrylate" refers to more than one (meth)acrylate group.

Multi (meth) acrylate monomers promote cross linking in a polymer network and can add to the rigidity of the final cured polymer. This is beneficial in some applications, especially when performance at elevated temperatures is required. However, in applications that involve dissimilar substrate bonding such as bonding metal to plastic, this enhanced rigidity has been noted to act negatively on performance. Beneficially, the monomers of the present invention are monofunctional as they comprise a mono (meth)acrylate group thereby preventing crosslinking and causing the cured composition to remain flexible and therefore suitable for use in sealing or bonding applications between dissimilar substrates.

Beneficially the composition of the invention is free from methyl methacrylate.

The hydroxy-functionalized mono(meth)acrylate compound of the composition of the invention comprises a mono(meth)acrylate group and a hydroxyl group. Beneficially the hydroxyl group promotes cure on different activity metals, by altering the hydrophilicity of the adhesive and improving surface wetting. Metals containing transition metals such as copper and iron promote the anaerobic cure. Mild steel has a high level of the transition metal iron and cures at a much faster rate (active metal) than stainless steel. Brass has a high level or copper and this also cures at a very fast rate (active metal). Stainless steel (inactive metal) on the other hand has a lower level of iron and a very low level (if any) copper and cures much slower than mild steel. Advantageously the anaerobically curable composition of the present invention provides improved cure properties when cured on an untreated inactive surface, that is beneficially the inactive surface does not require treatment such as roughening by chemical or physical abrasion, or priming the inactive surface to make it more active.

Mono(meth)acrylate monomers containing at least one hydroxyl group are employed in the present invention to provide intermolecular attraction in the cured polymer and produce a more durable adhesion with a metal substrate. Such monomers include hydroxyalkyl(meth)acrylates, the ethoxylated and/or propoxylated derivatives thereof, the adducts thereof with lactones, polyalkoxy monohydroxy mono(meth)acrylates. Particularly preferred are hydroxyalkyl(meth)acrylates having from $C_1$ to $C_{10}$ carbon atoms in the alkyl group, the ethoxylated and/or propoxylated derivatives thereof, the adducts thereof with lactones, and polyalkoxy monohydroxy mono(meth)acrylates thereof.

Examples of such monomers include hydroxyethyl(meth)acrylate, hydroxypropyl(meth)acrylate, hydroxybutyl(meth)acrylate, hydroxypentyl (meth)acrylate, hydroxyheptyl (meth)acrylate, hydroxynonyl(meth)acrylate, hydroxydecyl (meth)acrylate, their position isomers, the ethoxylated and/or propoxylated derivatives thereof, the adducts thereof with lactones, diethylene glycol mono(meth)acrylate, polyethylene glycol mono(meth)acrylate, propylene glycol mono (meth)acrylate, polypropylene glycol mono(meth)acrylate.

The hydroxy-functionalized mono(meth)acrylate compound of the composition of the invention comprises one or more suitable (meth)acrylate components which may be selected from among those that are a (meth)acrylate having the formula:

$H_2C=CGCO_2R^1$, where G may be hydrogen, halogen or alkyl groups having from 1 to about 4 carbon atoms, and $R^1$ may be a hydroxyl group having from 1 to about 16 carbon atoms.

The aromatic mono(meth)acrylate compound of the composition of the invention comprises a mono(meth)acrylate group and an aromatic ring. The aromatic mono(meth)acrylate compound is not the same compound as the hydroxyl-functionalized mono(meth)acrylate compound. Desirably the aromatic mono(meth)acrylate compound is not hydroxyl-functionalized. Beneficially the selection of monomers with aromatic ring structures allows the composition to interact with plastic materials which also contain an aromatic ring. Such aromatic rings serve as a component in the matrix to enhance plastic impregnation. The aromatic ring group of the monomer allows the composition to interact with, for example, acrylonitrile butadiene styrene, phenolic, polyphenylene sulphide.

One or more suitable aromatic (meth)acrylate components may be selected from among those that are a (meth)acrylate having the formula:

$H_2C=CGCO_2R^1$, where G may be hydrogen, halogen or alkyl groups having from 1 to about 4 carbon atoms, and $R^1$ may be an aromatic group having from 1 to about 14 carbon atoms or a substituted aromatic group having from 1 to about 60 carbon atoms.

The composition of the invention comprises a (meth)acrylate functionalised polyurethane resin. The (meth)acrylate functionalised polyurethane resin of the composition of the invention is highly flexible in its cured state. Beneficially the flexibility of the (meth)acrylate functionalised polyurethane resin provides the cured composition with flexibility and prevents the cured composition becoming overly rigid. The composition of the present invention may be used to form a bond or seal between two materials which have different co-efficients of thermal expansion, for example a metal and plastic. Inclusion of a (meth)acrylate functionalised polyurethane resin provides the cured composition with the flexibility to retain a bond or seal when the composition is used to bond or seal two materials with different co-efficients of thermal expansion. When placed under certain stresses, for example temperature changes, a composition which is too rigid may fail to maintain a bond or seal.

The composition of the invention comprises a cure initiator and optionally a cure accelerator. Beneficially the cure initiator initiates the anaerobic cure of the composition. The composition of the invention may comprise a cure accelerator which speeds the cure of the composition. When a cure accelerator is present, the composition cures in a shorter amount of time than a composition where the cure accelerator is not present.

In the composition of the invention the hydroxy-functionalized mono(meth)acrylate compound comprising a mono (meth)acrylate group and a hydroxyl group, may comprise a hydroxyethyl (meth)acrylate, for example hydroxyethyl methacrylate:

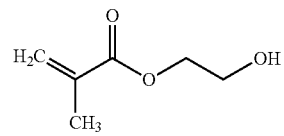

Beneficially hydroxyethyl methacrylate contains one methacrylate only, a mono(meth)acrylate group. The hydroxyl group is not polymerisable in an anaerobic environment so only the methacrylate group is functional for the purposes of the present invention.

In the composition of the invention the hydroxy-functionalized mono(meth)acrylate compound comprising a mono (meth)acrylate group and a hydroxyl group, may be present in an amount from about 5% to about 30% by weight based on the total weight of the composition, for example the hydroxy-functionalized mono(meth)acrylate compound may be present in an amount from about 7% to about 15% by weight based on the total weight of the composition.

In the composition of the invention the hydroxy-functionalized mono(meth)acrylate compound comprising a mono (meth)acrylate group and a hydroxyl group, may have a molecular weight below about 1000 g/mol, for example below about 800 g/mol, below about 600 g/mol, below about 400 g/mol, or below about 200 g/mol. Preferably the hydroxy-functionalized (meth)acrylate compound may have a molecular weight of from about 100 g/mol to about 150 g/mol.

In the composition of the invention the aromatic mono (meth)acrylate compound comprising a mono(meth)acrylate group and an aromatic ring, and desirably which is not hydroxyl-functionalized, may comprise benzyl (meth)acrylate, for example benzyl methacrylate:

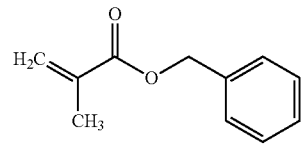

or furfuryl (meth)acrylate for example furfuryl methacrylate:

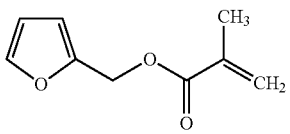

or combinations thereof. Beneficially benzyl (meth)acrylate or furfuryl (meth)acrylate contain one methacrylate only, a mono(meth)acrylate group. The aromatic ring structures are not polymerisable in an anaerobic environment so only the (meth)acrylate group is functional for the purposes of the present invention.

In the composition of the invention the aromatic mono(meth)acrylate compound comprising a mono(meth)acrylate group and an aromatic ring may comprise a substituted benzyl (meth)acrylate:

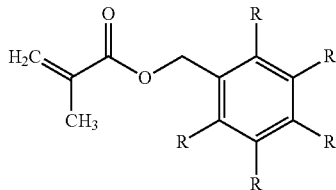

wherein each R may be independently selected from the following: hydrogen, a hydroxyl group, an alkyl group having from 1 to about 6 carbon atoms, an alkenyl group having from 1 to about 6 carbon atoms, an alkynl group having from 1 to about 6 carbon atoms, an hydroxyalkyl group having from 1 to about 6 carbon atoms, an hydroxyalkenyl group having from 1 to about 6 carbon atoms, an hydroxyalkynl group having from 1 to about 6 carbon atoms, a halogen group, an amino acid group, a carboxyl group or a nitro group, or any combination thereof.

In the composition of the invention the aromatic mono(meth)acrylate compound comprising a mono(meth)acrylate group and an aromatic ring may be present in an amount from about 5% to about 60% by weight based on the total weight of the composition, for example the aromatic mono(meth)acrylate compound may be present in an amount from about 25% to about 40% by weight based on the total weight of the composition.

In the composition of the invention the aromatic mono(meth)acrylate compound comprising a mono(meth)acrylate group and an aromatic ring may have a molecular weight below about 1000 g/mol, for example below about 800 g/mol, below about 600 g/mol, below about 400 g/mol, or below about 200 g/mol. Preferably the aromatic (meth)acrylate compound may have a molecular weight of from about 150 g/mol to about 200 g/mol.

In the composition of the invention the (meth)acrylate functionalised polyurethane resin may be present in an amount from about 20% to about 50% by weight based on the total weight of the composition, preferably the (meth)acrylate functionalised polyurethane resin may be present in an amount from about 25% to about 40% by weight based on the total weight of the composition.

In the composition of the invention the (meth)acrylate functionalised polyurethane resin may have a molecular weight of from about 5000 to about 7000 g/mol, preferably a molecular weight from about 5500 to about 6000 g/mol.

The anaerobic compositions may also include other conventional components, such as free radical initiators, free radical accelerators, inhibitors of free radical generation, as well as metal catalysts, such as iron and copper.

A number of well-known initiators of free radical polymerization may be incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy) valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

If desired the initiator component may be encapsulated. For example the initiator component may be an encapsulated peroxide, for example encapsulated benzoyl peroxide.

Compositions used in the present invention may further comprise thickeners and/or fillers. For example the composition of the invention the composition may comprise a hydrophobic silica. For example the composition may further comprises a polyethylene filler. In the composition of the invention the fillers, such as polyethylene fillers, may present in an amount from about 5% to about 15% by weight based on the total weight of the composition.

As mentioned above it will be appreciated that the composition used in the invention can include non-reactive species including resins. Such components do not participate in an anaerobic cure reaction. They are unreactive. Such components may however become part of the cure product having been incorporated therein during the curing of other components. Examples of such non-reactive species include: fumed silica, polyethylene, PTFE, mica, polyamide wax, titanium dioxide, barium sulphate.

The composition of the invention may be thixotropic as measured according to using a rotational viscometer according to BS EN ISO 3219:1995. The composition is viscous under static conditions and becomes less viscous when a stress is applied, such as when the composition is shaken, agitated, sheared, or otherwise stressed.

The composition of the invention may have a viscosity of about 500 mPa·s to about 3000 mPa·s as measured at 25° C. using BS EN 125092:2001.

The composition of the invention may be for bonding metal to plastic.

The plastic may optionally be selected from: acrylonitrile butadiene styrene ("ABS"), polycarbonate ("PC"), polycarbonate/acrylonitrile butadiene styrene ("PCABS"), polyarylamides, polyamides such as nylon, including nylon 6'6 (("Ny"), (poly[imino(1,6-dioxohexamethylene) iminohexamethylene])), acrylic plastic, polyvinyl chloride ("PVC") and poly(methyl methacrylate) ("PMMA").

The metal may optionally be selected from: for example, steel, including mild steel and stainless steel, brass including clock brass, bronze, or zinc, aluminium, iron, copper, beryllium, cobalt, manganese, nickel, cadmium, gold, silver or alloys thereof. Suitably, the second substrate may be an active substrate, containing trace amounts of a transition metal.

The anaerobically curable compositions for use in the present invention may be prepared using conventional methods which are well known to those persons of skill in the art. For instance, the components of the composition may be mixed together in any convenient order consistent with the roles and functions the components are to perform in the compositions. Conventional mixing techniques using known apparatus may be employed.

The invention also comprises a cure product formed by the anaerobic cure of a composition of the invention.

A method of sealing a joint between male and female mating parts may be performed by utilising the cure product of the invention to form a seal for the joint.

In one aspect, the invention provides a method of sealing or bonding a joint between a male and a female mating parts comprising:
 (i) providing a composition according to the invention;
 (ii) applying the composition to at least one mating part;
 (iii) joining the mating parts so as to form a joint between the male and female mating parts;
 (iv) and curing the composition so that the joint between the male and female mating parts is sealed by the cured composition.

The method of the invention may provide a method of sealing or bonding a joint between a male and a female mating parts wherein one of the male or female mating parts is formed from a metal and the other is formed from a plastics material.

The composition of the invention may be used for sealing or bonding a joint between male and female mating parts.

The composition of the invention may be used for sealing or bonding a joint between male and female mating parts wherein one of the male or female mating parts is formed from a metal and the other is formed from a plastics material.

In one aspect the invention provides a sealed or bonded joint assembly comprising a male mating part and a female mating part mated together and forming a joint and the cure product of a composition of the invention forming a seal for the joint.

DETAILED DESCRIPTION

It should be readily apparent to one of ordinary skill in the art that the examples disclosed herein below represent illustrative examples only, and that other arrangements and methods capable of reproducing the invention are possible and are embraced by the present invention.

EXPERIMENTAL

The components of a representative composition according to the invention are listed in Table 1:

| Material | Wt % (based on total weight of the composition) |
|---|---|
| Hydroxyethyl methacrylate | 5-30 |
| Benzyl methacrylate | 5-40 |
| Methacrylate functionalised polyurethane resin | 20-50 |
| PVA beads | 0-15 |
| Carboxyethyl acrylate | 1-8 |
| Acetyl Phenyl Hydrazine | 0.1-1 |

-continued

| Material | Wt % (based on total weight of the composition) |
|---|---|
| Acid Saccharin | 0.1-3 |
| Stabiliser 1 | 0.01-0.15 |
| Stabiliser 2 | 0.01-0.25 |
| Polypropylene filler | 5-15 |
| Aerosil 380 Hydrophilic | 1-3 |
| Aerosil R202 Hydrophobic | 1-2 |
| Aerosil P972 | 2-4 |
| Tert-butyl peroxybenzoate | 0.5-3 |
| Polyethylene glycol monooleate | 0-15 |
| Thixatrol ST | 0-2 |
| Yellow dye | 0-0.5 |

Aerosil: Fumed silica available from Evonik Industries;
Thixatrol ST: Hydroxy modified aliphatic hydrocarbon available from Elementis Specialities.

The anaerobic composition is prepared by mixing the materials in Table 1 at room temperature.

Lap shear strength was assessed for various substrates using various compositions within the ranges set forth in Table 1.

EXAMPLES

The following compositions were prepared:

| Material | Sample 1 Wt % (based on total weight of the composition) | Sample 2 |
|---|---|---|
| Hydroxyethyl methacrylate | 13 | 19.5 |
| Benzyl methacrylate | 32 | 19.5 |
| Methacrylate functionalised polyurethane resin | 36 | 32 |
| PVA beads | 0 | 6.2 |
| Carboxyethyl acrylate | 2.6 | 2.5 |
| Acetyl Phenyl Hydrazine | 0.5 | 0.5 |
| Acid Saccharin | 0.5 | 0.5 |
| Stabiliser 1 | 0.1 | 0.1 |
| Stabiliser 2 | 0.1 | 0.1 |
| Polypropylene filler | 10 | 8 |
| Aerosil 380 Hydrophilic | 0 | 1.8 |
| Aerosil R202 Hydrophobic | 0 | 0.6 |
| Aerosil P972 | 3 | 0 |
| Tert-butyl peroxybenzoate | 2.2 | 2.2 |
| Polyethylene glycol monooleate | 0 | 5 |
| Thixatrol ST | 0 | 1.3 |
| UK yellow dye | 0 | 0.2 |

The sample compositions according to the invention were tested to determine the lap shear strength. The sample compositions were compared to Loctite 577, Loctite 603, Loctite 638, Loctite 648, Loctite 620, and Loctite 6300 from Henkel.

| Comparative compositions | Description |
|---|---|
| Loctite 577 | Thread sealant comprising of dimethacrylate monomers/oligomers/resins with standard anaerobic cure systems |
| Loctite 603 | Retaining products comprising of dimethacrylate monomers/oligomers/resins and standard anaerobic cure systems |
| Loctite 638 | Retaining products comprising of dimethacrylate monomers/oligomers/resins and standard anaerobic cure systems |

| Comparative compositions | Description |
|---|---|
| Loctite 620 | Retaining products comprising of dimethacrylate monomers/oligomers/resins and standard anaerobic cure systems |
| Loctite 6300 | Retaining products comprising of dimethacrylate monomers/oligomers/resins and standard anaerobic cure systems |

Lap Strength Testing

Lap strength testing was performed according to ASTM D1002-05 (Oct. 1, 2005).

Break Torque Testing

Break torque testing was performed according to ASTM D5649.

Metal to PVC Bonding

Polyvinyl chloride (PVC) bonding to stainless was tested for sample 2. The bonded parts were cured were heat treated at 80° C. for 60 minutes prior to curing for 18 hours at room temperature. 5 independent replicates (N=5) were carried out. The composition of the present invention provided greatly improved bonding of PVC to stainless steel in comparison a known composition. The results were:

| Sample | N1 | N2 | N3 | N4 | N5 | Mean | σ | Max | Min |
|---|---|---|---|---|---|---|---|---|---|
|  | \multicolumn{9}{c}{Lap shear strength (N/mm$^2$)} |
| Loctite 577 | 0.0 | 0.0 | 0.0 | 0.0 | 0.0 | 0.0 | 0.0 | 0.0 | 0.0 |
| Sample 2 | 3.2 | 4.3 | 6.1 | 4.8 | 4.4 | 4.5 | 1.1 | 6.1 | 3.2 |

Metal to Nylon Bonding

Nylon bonding to stainless and mild steel was tested for sample 1. The bonded parts were cured for 24 hours at room temperature or were heat treated at 80° C. for 45 minutes prior to curing for 24 hours at room temperature. The results were:

| | Sample | | | | | |
|---|---|---|---|---|---|---|
| | Loctite 603 | Loctite 638 | Loctite 648 | Loctite 620 | Loctite 6300 | Sample 1 |
| Lap shear strength 24 hours stainless steel | 0.9 | 0.0 | 2.2 | 0.0 | 0.0 | 5.5 |
| Lap shear strength 24 hours mild steel | 0.0 | 0.0 | 0.0 | 0.0 | 0.0 | 3.0 |
| Lap shear strength 80° C. for 45 minutes and 24 hours stainless steel | 0.9 | 0.0 | 1.2 | 0.7 | 0.0 | 5.9 |
| Lap shear strength 80° C. for 45 minutes and 24 hours mild steel | 1.0 | 0.8 | 1.3 | 0.0 | 0.0 | 6.7 |

Nylon bonding to stainless was tested for sample 2. The bonded parts were cured for 24 hours or heat treated for 45 minutes at 80° C. followed by cure for 18 hours at room temperature. 5 independent replicates (N=5) were carried out for each time point. The results were:

| | Sample | N1 | N2 | N3 | N4 | N5 | Mean | δ | Max | Min |
|---|---|---|---|---|---|---|---|---|---|---|
| | | \multicolumn{9}{c}{Break torque (Nm)} |
| 24 hours | Loctite 577 | 0.6 | 0.5 | 0.0 | 0.0 | 0.3 | 0.3 | 0.3 | 0.6 | 0.0 |
| | Sample 2 | 3.7 | 2.8 | 3.3 | 2.9 | 3.4 | 3.2 | 0.4 | 3.7 | 2.8 |
| 45 minutes at 80° C. and 18 hours at RT | Loctite 577 | 0.4 | 0.5 | 0.4 | 0.6 | 0.1 | 0.4 | 0.2 | 0.6 | 0.1 |
| | Sample 2 | 5.6 | 5.5 | 5.8 | 5.6 | 5.8 | 5.7 | 0.1 | 5.8 | 5.5 |

Nylon bonding to stainless steel was tested for sample 2 after humidity resistance. The bonded parts were cured for 45 minutes at 80° C. followed by 18 hours at room temperature, followed by 72 hours at 40° C. at 98% relative humidity. 5 independent replicates (N=5) were carried out for each time point. The results were:

| Sample | N1 | N2 | N3 | N4 | N5 | Mean | δ | Max | Min |
|---|---|---|---|---|---|---|---|---|---|
| | \multicolumn{9}{c}{Break torque (Nm)} |
| Loctite 577 | 1.3 | 1.2 | 0.7 | 1.5 | 0.8 | 1.1 | 0.3 | 1.5 | 0.7 |
| Sample 2 | 4.9 | 4.8 | 4.7 | 4.7 | 4.9 | 4.8 | 0.1 | 4.9 | 4.7 |

The compositions of the present invention provided greatly improved lap shear strength and break torque of nylon to both stainless steel (inactive metal) and mild steel (active metal) in comparison with known compositions. The composition of the present invention had greatly improved resistance to humidity stress.

Metal to Polyphenylene Sulfide Bonding

Polyphenylene sulfide bonding to stainless and mild steel was tested for sample 1. The bonded parts were cured for 24 hours at room temperature or were heat treated at 80° C. for 45 minutes prior to curing for 24 hours at room temperature. The compositions of the present invention provided greatly improved lap shear strength bonding of polyphenylene sulfide to both stainless steel (inactive metal) and mild steel (active metal) in comparison with known compositions. The results were:

|  | Sample | | | | | |
| --- | --- | --- | --- | --- | --- | --- |
|  | Loctite 603 | Loctite 638 | Loctite 648 | Loctite 620 | Loctite 6300 | Sample 1 |
| Lap shear strength 24 hours stainless steel | 2.0 | 0.8 | 0.9 | 0.0 | 0.0 | 5.1 |
| Lap shear strength 24 hours mild steel | 0.0 | 0.0 | 0.0 | 0.0 | 0.0 | 1.9 |
| Lap shear strength 80° C. for 45 minutes and 24 hours stainless steel | 3.8 | 4.5 | 3.7 | 2.5 | 2.3 | 6.4 |
| Lap shear strength 80° C. for 45 minutes and 24 hours mild steel | 4.1 | 3.0 | 3.3 | 1.0 | 0.0 | 8.3 |

Metal to Phenolic Bonding

Phenolic bonding to stainless and mild steel was tested for sample 1. The bonded parts were cured for 24 hours at room temperature or were heat treated at 80° C. for 45 minutes prior to curing for 24 hours at room temperature. The compositions of the present invention provided greatly improved lap shear strength bonding of phenolic to both stainless steel (inactive metal) and mild steel (active metal) in comparison with known compositions. The results were:

|  | Sample | | | | | |
| --- | --- | --- | --- | --- | --- | --- |
|  | Loctite 603 | Loctite 638 | Loctite 648 | Loctite 620 | Loctite 6300 | Sample 1 |
| Lap shear strength 24 hours stainless steel | 2.4 | 0.0 | 1.1 | 0.3 | 0.0 | 5.9 |
| Lap shear strength 24 hours mild steel | 0.7 | 0.0 | 0.0 | 0.0 | 0.0 | 4.4 |
| Lap shear strength 80° C. for 45 minutes and 24 hours stainless steel | 5.1 | 4.7 | 3.9 | 3.0 | 0.0 | 9.6 |
| Lap shear strength 80° C. for 45 minutes and 24 hours mild steel | 7.4 | 6.0 | 8.1 | 4.4 | 0.0 | 9.2 |

Metal to Acrylonitrile Butadiene Styrene Bonding

Acrylonitrile butadiene styrene bonding to stainless and mild steel was tested for sample 1. The bonded parts were cured for 24 hours at room temperature or were heat treated at 80° C. for 45 minutes prior to curing for 24 hours at room temperature. The compositions of the present invention provided greatly improved lap shear strength bonding of ABS to both stainless steel (inactive metal) and mild steel (active metal) in comparison with known compositions. The results were:

|  | Sample | | | | | |
|---|---|---|---|---|---|---|
|  | Loctite 603 | Loctite 638 | Loctite 648 | Loctite 620 | Loctite 6300 | Sample 1 |
| Lap shear strength 24 hours stainless steel | 0.0 | 0.0 | 0.0 | 0.0 | 0.0 | 4.2 |
| Lap shear strength 24 hours mild steel | 0.0 | 0.0 | 0.0 | 0.0 | 0.0 | 0.0 |
| Lap shear strength 80° C. for 45 minutes and 24 hours stainless steel | 1.5 | 0.1 | 0.6 | 2.8 | 0.2 | 6.6 |
| Lap shear strength 80° C. for 45 minutes and 24 hours mild steel | 0.6 | 0.9 | 2.2 | 1.4 | 2.1 | 5.5 |

Metal to Metal Bonding

Stainless steel bonding to stainless steel was tested for sample 2. The bonded parts were cured for 24 hours at room temperature or were heat treated at 80° C. for 45 minutes prior to curing for 24 hours at room temperature. The compositions of the present invention provided greatly improved break torque bonding of stainless steel to stainless steel (inactive metals) in comparison with known compositions. The results were:

|  | Sample | N1 | N2 | N3 | N4 | N5 | Mean Break torque (Nm) | δ | Max | Min |
|---|---|---|---|---|---|---|---|---|---|---|
| 1 hour | Loctite 577 | 1.3 | 0.6 | 0.7 | 0.7 | 0.2 | 0.7 | 0.4 | 1.3 | 0.2 |
|  | Sample 2 | 1.3 | 0.4 | 0.9 | 0.8 | 1.4 | 1.0 | 0.4 | 1.4 | 0.4 |
| 18 hours | Loctite 577 | 7.1 | 8.6 | 4.0 | 8.7 | 6.8 | 7.0 | 1.9 | 8.7 | 4.0 |
|  | Sample 2 | 11.1 | 11.3 | 11.7 | 10.6 | 10.1 | 11.0 | 0.6 | 11.7 | 10.1 |
| 168 hours | Loctite 577 | 16.1 | 147 | 12.0 | 13.0 | 13.1 | 13.8 | 1.6 | 16.1 | 12.0 |
|  | Sample 2 | 12.5 | 12.9 | 13.8 | 13.2 | 12.2 | 12.9 | 0.6 | 13.8 | 12.2 |

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. An anaerobically curable composition comprising:
   (i) a hydroxy-functionalized mono(meth)acrylate compound in an amount of about 5-30 wt %, based on the total weight of the composition,
   (ii) an aromatic mono(meth)acrylate compound which is not the same compound as the hydroxy-functionalized mono(meth)acrylate compound and comprises benzyl methacrylate, tetrahydrofurfuryl methacrylate or combinations thereof, in an amount of about 25-40 wt %, based on the total weight of the composition,
   (iii) a (meth)acrylate functionalised polyurethane resin in an amount of about 25-40 wt %, based on the total weight of the composition, and
   (iv) an anaerobic cure inducing component comprising a peroxide.

2. The composition of claim 1 wherein the hydroxy-functionalized mono(meth)acrylate compound comprises hydroxyethyl methacrylate.

3. The composition of claim 1 wherein the hydroxy-functionalized mono(meth)acrylate compound is present in an amount from about 7% to about 15% by weight based on the total weight of the composition.

4. The composition of claim 1 wherein the hydroxy-functionalized mono(meth)acrylate compound has a molecular weight below about 1000 g/mol, or below about 800 g/mol, or below about 600 g/mol, or below about 400 g/mol, or below about 200 g/mol.

5. The composition of claim 1 wherein the hydroxy-functionalized mono(meth)acrylate compound has a molecular weight of from about 100 g/mol to about 150 g/mol.

6. The composition of claim 1 wherein the aromatic mono(meth)acrylate compound has a molecular weight below about 1000 g/mol, or below about 800 g/mol, or below about 600 g/mol, or below about 400 g/mol, or below about 200 g/mol.

7. The composition claim 1 wherein the aromatic mono (meth)acrylate compound has a molecular weight of from about 150 g/mol to about 200 g/mol.

8. An anaerobically curable composition comprising:
   (i) a hydroxy-functionalized mono(meth)acrylate compound in an amount of about 5-30 wt %, based on the total weight of the composition,
   (ii) an aromatic mono(meth)acrylate compound which is not the same compound as the hydroxy-functionalized mono(meth)acrylate compound, in an amount of about 25-40 wt %, based on the total weight of the composition,
   (iii) a (meth)acrylate functionalised polyurethane resin in an amount of about 25-40 wt %, based on the total weight of the composition, wherein the (meth)acrylate functionalised polyurethane resin has a molecular weight of from about 5000 to about 7000 g/mol, or a molecular weight from about 5500 to about 6000 g/mol, and (iv) an anaerobic cure inducing component comprising a peroxide.

9. The composition of claim 1 wherein the composition further comprises a polyethylene filler.

10. The composition of claim 9 wherein the polyethylene filler is present in an amount from about 5% to about 15% by weight based on the total weight of the composition.

11. The composition of claim 1 wherein the composition further comprises a hydrophobic silica.

12. The composition of claim 1 wherein the composition is thixotropic.

13. The composition of claim 1 wherein the composition has a viscosity of about 500 mPa·s to about 3000 mPa·s as measured at 25° C. using BS EN 125092:2001.

14. A cure product formed by anaerobic cure of a composition according to claim 1.

15. A method of sealing a joint between a male and a female mating parts comprising:
(i) providing a composition according to claim 1;
(ii) applying the composition to at least one mating part;
(iii) joining the mating parts so as to form a joint between the male and female mating parts;
(iv) and curing the composition so that the joint between the male and female mating parts is sealed by the cured composition;
optionally wherein one of the male or female mating parts is formed from a metal and the other is formed from a plastics material.

16. A sealed joint assembly comprising a male mating part and a female mating part mated together and forming a joint and the cure product of a composition according to claim 1 forming a seal for the joint.

17. The composition of claim 1, wherein the (meth) acrylate functionalized polyurethane resin is present in an amount of about 25-36 wt %, based on the total weight of the composition.

* * * * *